United States Patent Office 3,801,562
Patented Apr. 2, 1974

3,801,562
N-ACYLATED PEPTIDES OF AMINO AROMATIC ACIDS AND THEIR DERIVATIVES
Peter L. de Benneville, Philadelphia, Pa., assignor to Rohm and Haas Company, Philadelphia, Pa.
No Drawing. Filed Nov. 19, 1970, Ser. No. 91,176
Int. Cl. C07c *103/20, 103/32, 103/52*
U.S. Cl. 260—112.5                    12 Claims

ABSTRACT OF THE DISCLOSURE

Polypeptides which are useful for evaluating pancreatic enzyme sufficiency in animal organisms have the formula $$RCO-A_n-NHR'CO-B_m-NHZ$$

wherein

R is a hydrogen atom; a phenyl group; a phenyl group substituted with one or more halogen atoms, ($C_1$–$C_4$) alkyl groups, hydroxy groups, ($C_1$–$C_4$)alkoxy groups, ($C_1$–$C_4$)alkoxy carbonyl groups, or similar substituents which will not interfere with the test efficacy of the polypeptide; a ($C_1$–$C_{12}$)alkyl group, preferably a ($C_1$–$C_6$)akyl group; a ($C_1$–$C_{12}$)alkyl group substituted by one or more halogen atoms, ($C_1$–$C_4$)alkoxy groups, hydroxy groups, acyloxy groups, preferably ($C_1$–$C_4$) alkanoyloxy or benzoyloxy, polyalkoxyalkyl groups, phenyl groups, or similar substituents which will not interfere with the test efficacy of the polypeptide; a ($C_1$–$C_{12}$)alkoxy group, preferably a ($C_1$–$C_6$)alkoxy group; an aryloxy group having up to 10 carbon atoms; or a divalent alkylene group having up to 6 carbon atoms, in which case the formula would be written as $$R(-CO-A_n-NHR'CO-B_m-NHZ)_2$$

or, when the blocking group is derived from oxalic acid, as $$(CO-A_n-NHR'CO-B_m-NHZ)_2$$

NHR'CO is the amino acid linkage derived from L-phenylalanine, L-tyrosine, L-leucine, L-methionine, L-tryptophan, L-arginine, or L-lysine;
Z is a group of the formula

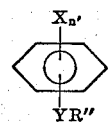

wherein

R'' is a hydroxy group, a ($C_1$–$C_4$)alkoxy group, a ($C_1$–$C_4$) alkoxyalkoxy group, a ($C_1$–$C_8$)aminoalkoxy group, an amino group, a ($C_1$–$C_4$)monoalkylamino group, a ($C_1$–$C_4$)dialkylamino group, a group of the formula NHCH$_2$COR'', or a salt, such as the sodium, potassium, or ammonium salt, of the group in which R'' is a hydroxy group;
Y is a group of the formula —CO— or —SO$_2$—;
X is a hydroxy group, a ($C_1$–$C_4$)alkyl group, a halogen atom, a ($C_1$–$C_4$)alkoxy group, or a similar substituent which will not interfere with the test efficacy of the polypeptide; and
n' is 0, 1, or 2;
A and B are the residues of low molecular weight amino acids, such as glycyl, alanyl, glycylglycyl, and the like, and
n and m are 0, 1, or 2.

CROSS-REFERENCE TO RELATED APPLICATION

This application is related to copending U.S. patent application Ser. No. 91,173, of P. L. de Benneville and N. J. Greenberger, filed on Nov. 19, 1970, assigned to a common assignee, and entitled, "Method for Evaluating Pancreatic Enzyme Sufficiency and Compounds Useful Therein."

This invention realtes to novel compounds which are useful in carrying out a novel diagnostic test for determining pancreatic enzyme insufficiency.

The exocrine secretion of the pancreas contains several enzymes which are important to digetsion, including, trypsinogen, chymotrypsinogen, lipase, α-amylase, and phospholipase. This secretion, which is stimulated by the hormones secretin and pancreozymin, flows through the pancreatic duct to the small intestine, where trypsin and chymotrypsin are released from their inactive precursors. At this point, these two enzymes convert polypeptides in the stomach chyme to smaller peptides and amino acids which are absorbable.

The exocrine function of the pancrease may deteriorate from a number of causes, including pancreatitis, pancreatic tumors, pancreatic cysts, cystic fibrosis, and pancreatic duct obstruction. Such deterioration can lead to complex malabsorption syndromes which are not often readily diagnosed during early stages.

At the present time, there is no simple and reliable test to determine pancreatic enzyme insufficiency. The tests currently most frequently employed are the secretin test and a close variation, the secretin-pancreozymin test. These tests involve analysis of duodenal aspirates following secretin and pancreozymin stimulation. Although these tests may provide useful information about the functioning of the pancreas, they are difficult to perform and time-consuming, since they require intestinal intubation and collection of duodenal contents for two hours, fluoroscopy to check the position of the intestinal tube, and intravenous injection of foreign proteins to which allergic reactions can occur. Furthermore, there is some uncertainty as to what constitutes an abnoral test. The simpler procedures which can be used, such as analysis for serum enzymes or fecal enzymes, are generally considered unreliable indices of pancreatic insufficiency and they may not measure the extent of pancreatic insufficiency. Consequently, it would be extremely desirable to have a quantitative test of pancreatic enzyme insufficiency which would be not only reliable but also simple to administer and to evaluate.

It has now been discovered that pancreatic enzyme sufficiency in an animal organism can be evaluated by internally administering an effective amount of a polypeptide which is hydrolyzable by one or more of the pancreatic endopeptidases to give a residue which is absorbable by and recoverable from the organism. The residue is absorbed and subsequently excreted in the urine, where analysis can determine the presence or absence of the residue. In animals with normal pancreatic function, it has been found that the peptide is hydrolyzed to liberate an amino acid or other residue which is not metabolized, which is then absorbed, excreted, and analytically detected. In animals in which abnormal pancreatic function has been produced, the peptide remains substantially unydrolyzed, thus resulting in the essentially no detectable residue in the urinary analysis.

A wide variety of polypeptides can be used in the practice of the invention, and any polypeptide which contains three essential components can be employed. The first essential component is an amino acid linkage which will be hydrolytically cleaved in the presence of one of the pancreatic endopeptidases. The second essential element is a blocking group on the amino function of this amino acid linkage. The third essential element is a pharmacologically-acceptable analyzable group which will be hydrolyzed from the polypeptide in the presence of a pancreatic enzyme to produce a compound which is not a natural product, which is absorbed and eliminated in the body, and which is easily determinable by quantitative analytical techniques.

Among the polypeptides which are useful in the pancreatic insufficiency test are the novel peptides which have the following formula $$RCO—A_n—NHR'CO—B_m—NHZ \quad (II)$$

wherein

R is a hydrogen atom; a phenyl group; a phenyl group substituted with one or more halogen atoms, $(C_1–C_4)$ alkyl groups, hydroxy groups, $(C_1–C_4)$ alkoxy groups, $(C_1–C_4)$ alkoxy carbonyl groups, or similar substituents which will not interfere with the test efficacy of the polypeptide; a $(C_1–C_{12})$ alkyl group, preferably a $(C_1–C_6)$ alkyl group; a $(C_1–C_{12})$ alkyl group substituted by one or more halogen atoms, $(C_1–C_4)$ alkoxy groups, hydroxy groups, acyloxy groups, preferably $C_1–C_4$ alkanolyoxy or benzoyloxy, polyalkoxyallyl groups, phenyl groups, or similar substituents which will not interfere with the test efficacy of the polypeptide; a $(C_1–C_{12})$ alkoxy group, preferably a $(C_1–C_6)$ alkoxy group; an aryloxy group having up to 10 carbon atoms; or a divalent alkylene group having up to 6 carobn atoms, in which case Formula II would be written as $$R(—CO—A_n—NHR'CO—B_m—NHZ)_2 \quad (IIa)$$

or, when the blocking group is derived from oxalic acid, as $$(CO—A_n—NHR'CO—B_m—NHZ)_2 \quad (IIb)$$

NHR'CO is the amino acid linkage derived from L-phenylalanine, L-tyrosine, L-leucine, L-methionine, L-tryptophan, L-arginine, or L-lysine;

Z is a group of the formula

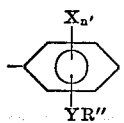

wherein

R'' is a hydroxy group, a $(C_1–C_4)$ alkoxy group, a $(C_1–C_4)$ alkoxyalkoxy group, a $(C_1–C_8)$ aminoalkoxy group, an amino group, a $(C_1–C_4)$ monoalkylamino group, a $(C_1–C_4)$ dialkylamino group, a group of the formula —NHCH$_2$COR'', or a salt, such as the sodium, potassium, or ammonium salt, of the group in which R'' is a hydroxy group;

Y is a group of the formula —CO— or —SO$_2$—;

X is a hydroxy group, a $(C_1–C_4)$ alkyl group, a halogen atom, a $(C_1–C_4)$ alkoxy group, or a similar substituent which will not interfere with the test efficacy of the polypeptide; and n' is 0, 1, or 2;

A and B are the residues of low molecular weight amino acids, such as glycyl, alanyl, glycylglycyl, and the like, and n and m are 0, 1, or 2.

In general, the test will be facilitated by a relatively high solubility of the polypeptide in the body system. Consequently, those polypeptides having relatively low molecular weight, and those polypeptides having a free carboxy group or a salt of a carboxy group are especially preferred.

Representative examples of suitable RCO-groups include benzoyl, adipoyl, malonyl, succinoyl, formyl, acetyl, propionyl, butyryl, hexanoyl, heptanoyl, octanoyl, dodecanoyl, acetosalicylyl, oxalyl, ethoxycarbonyl, benzyloxycarbonyl, chlorobenzoyl, iodobenzoyl, toluoyl, ethylbenzoyl, anisoyl, chloroacetyl, ethoxypropionyl, hydroxybutyryl, phenylacetyl, and the like.

Representative examples of suitable -NHZ groups include those derived from p-aminobenzoic acid, m-aminobenzoic acid, 4-amino-3-iodobenzoic acid, 4-amino-2-hydroxybenzoic acid, 4-amino-3-methylbenzoic acid, 4-amino-2,6-dimethylbenzoic acid, 4-aminohippuric acid, p-aminobenzenesulfonic acid, 4-amino-2-ethylbenzoic acid, 4-amino-2-butylbenzoic acid, 4-amino-2-bromobenzoic acid, 4-amino-2-ethoxybenzoic acid, 3-amino-4-hydroxybenzoic acid, 3-amino-4-methylbenzoic acid, 3-amino-4-chlorobenzoic acid, m-aminobenzenesulfonic acid, anthranilic acid, 4-amino-3-methylbenzenesulfonic acid, 4-amino-3-hydroxybenzenesulfonic acid, and the like, the salts, such as the sodium, potassium, and ammonium salts, of such acids, the $(C_1–C_4)$ alkyl esters, such as the methyl, ethyl, n-propyl, isopropyl, n-butyl, isobutyl, and t-butyl esters of such acids, the $(C_1–C_4)$ alkoxyalkyl esters, such as the ethoxyethyl and methoxyethyl esters of such acids, the $(C_1–C_6)$ aminoalkyl esters, such as the N,N-dimethylaminoethyl, morpholinoethyl, piperidinoethyl, piperazinoethyl, and N,N-diethylaminomethyl esters of such acids, the amides of such acids, and the alkyl amides such as the N,N-diethylamides, of such acids. The free acids and their salts are preferred.

Although only the L-isomer of a polypeptide of the invention is actually cleaved in the presence of the pancreatic enzymes, racemic mixtures of the compounds can be used without any interference with the test procedure or results. Generally, however, when a racemic mixture is used, a double dose of the compound must be given.

The compounds of the invention are generally prepared by first blocking the amino group of the amino acid with any of the suitable blocking groups. Various preparative techniques for carrying out this blocking step are well-known in the art and can be followed in preparing the compounds of the invention. One useful method involves reacting the amino acid with the acid chloride of the blocking group in the presence of a basic catalyst or a base scavenger in either an aqueous or non-aqueous solvent system. The analyzable group is then attached by amidation or esterification of blocked amino acid. Various preparative techniques which are well-known in the art can be used for making the amides and esters. One useful novel method involves reacting a mixed anhydride of the blocked amino acid with the amino-containing analyzable group. The mixed anhydride can conveniently be prepared by reacting the blocked amino acid with ethyl chloroformate in the presence of a tertiary amine. Generally, the mixed anhydride is then reacted with an ester containing the free amino group. The reaction of the mixed anhydride with a free acid containing an amino group is a separate invention which is disclosed and claimed in another patent application, Ser. No. 256,551, filed on May 24, 1972, by P. L. de Benneville, et al., and assigned to a common assignee. Specific embodiments of suitable techniques for preparing the novel peptides of the invention are found in the examples below.

The pancreatic insufficiency test is carried out by internally administering, generally orally, an effective dosage of one of the novel peptides of the invention, thereafter collecting the urine for a suitable period of time, and analyzing the urine to determine the quantity of the appropriate peptide fragment. Generally, it has been found that a urine collection procedure of from about 4 to about 10 hours, and preferably from about 5 to about 7 hours, after administration of the peptide will provide a suitable test. If the pancreas is secreting enzymes normally, the presence of the pancreatic enzymes will cause cleavage of the peptide, and a high quantity of the analyzable residue will be recovered in the urine. In the absence of normal pancreatic function, the peptide will not be readily cleaved and only a small quantity of the analyzable residue will be recovered in the urine.

The amount of peptide which is administered to the animal must be sufficient to produce an analyzable residue in the urine of a normal animal. Generally, an amount of about 2 mg. to about 50 mg. of the peptide per kilogram of body weight of the animal will be effective in carrying out the test of the invention. A preferred dosage rate is about 5 mg./kg. to about 10 mg./kg. of the peptide. In humans, a dosage of about 350 mg. to about 700 mg., such as, for example, about 500 mg., will generally be effective.

A wide variety of test protocols can be employed in carrying out the pancreatic insufficiency test of the invention. The following procedure is exemplary of those which can be employed:

The test should be administered in the morning after a light non-fatty breakfast. The urinary bladder should be emptied before the start of the test.

The test subject is given a suitable oral dose of a peptide of the invention, such as for example a 0.5 gram oral dose for a human subject, and all urine is collected for the following 6 hours. Care should be taken to obtain a urine sample between the fifth (5th) and sixth (6th) hours. Water or caffeine may be administered during the test period to induce urination but other diuretics and drugs should generally be withheld. Snacks or a light non-fatty meal may be permitted.

The total urine volume is determined and either the entire sample or an aliquot is refrigerated or frozen until chemical analysis.

The urine is then analyzed for the analyzable group. For example, when the analyzable group is an aromatic amine, the Bratton-Marshall method using p-aminobenzoic acid as a standard can be employed. When the analyzable group is p-aminobenzoic acid, individuals with normal exocrine pancreatic secretion will generally excrete at least 25% of the ingested p-aminobenzoic acid or about 40 mg. of p-aminobenzoic acid during the 6-hour test period after correcting for background urinary aromatic amines. The background may be ascertained on a six-hour urinary collection on the day prior to the test or a value of 3 mg. per 6 hours may be assumed.

Recovery of an unusually small percentage, such as 5% (8 mg.) or less when p-aminobenzoic acid is the analyzable group, of the administered dose of the polypeptide in the absence of malabsorption, liver or kidney disease indicates significant exocrine pancreatic insufficiency. The extent to which any of these extrapancreatic pathologies may influence the results of the test can be determined by repeating the test 48 hours later using an oral dose of 160 mg. p-aminobenzoic acid.

Any analytical method can be used which will determine quantitatively the presence of the hydrolyzed analyzable group (—Q" in Formula I or —NHZ in Formula II) in the collected urine. When the analyzable group is the residue of an aminobenzoic acid or of an aminobenzenesulfonic acid or any of their derivatives, the Bratton-Marshall method, as described in the Journal of Biological Chemistry, 128, 537 (1939), and in J. A. O. A. C., 51, 612 (1968), will be a suitable analytical technique. The analyzable group can also contain tagged atoms. Thus, when this group contain $I^{125}$ or $I^{131}$ atoms, γ-ray counting can be used as the analytical technique. The analyzable group can also be a dye-forming substance and its presence in the urine can then be determined by colorimetric and related analytical techniques.

The peptides which are useful in carrying out the pancreatic insufficiency test of the invention can conveniently be formulated and administered in various forms of pharmaceutical compositions. The pharmaceutical compositions comprise a nontoxic pharmacologically-acceptable carrier or diluent and one of the peptides of the invention. Either a solid or a liquid carrier can be used. Among the solid carriers which can be used are lactose, terra alba, sucrose, talc, gelatin, starch, agar, pectin, acacia, calcium phosphate, magnesium stearate, stearic acid, and the like. Among the liquid carriers which can be used are syrup, peanut oil, olive oil, sesame oil, water, and the like. Additionally, the carrier or diluent can include any time delay material known in the art, such as glyceryl monostearate, glyceryl distearate, and the like, either along or in combination with a wax. Other pharmacologically-acceptable materials such as sweetning agents, flavoring agents, coloring matter or dyes, emulsifying agents, dispersants, suspending agents, thickeners, binders, preservatives, antioxidants, inert diluents, and the like, can also be formulated in the pharmaceutical compositions, if desired. While the majority of the pharmacologically-acceptable materials are inert, it may be advantageous under certain circumstances to incorporate other therapeutic agents in the compositions of the invention. To inhibit the attack of gastric juices on the peptides, it may also be advantageous to formulate the peptide with an antacid ingredient, such as sodium bicarbonate, or the like.

The pharmaceutical compositions of the invention will ordinarily contain from about 250 milligrams to about 3500 milligrams of a peptide of the invention. A preferred composition will contain from about 350 milligrams to about 700 milligrams of the peptide. The active compound will normally constitute from about 1% to 95% by weight of the total composition. Ordinarily, since it will be desired to administer the active compound in fairly concentrated form, that is, with only so much pharmaceutical carrier as is necessary or convenient to assist in administration, the active compound will constitute under most circumstances a fairly high proportion of the total composition.

The compositions of the invention can be formulated into any of a wide variety of pharmaceutical forms, such as a capsule, tablet, bolus, packaged powder, or a liquid suspension. For example, if a solid carrier is used, the preparation can be tableted, placed in a hard gelatin capsule in powder or pellet form, or made into a troche or lozenge. If a liquid carrier is used, the preparation can be in the form of a syrup, solution, emulsion, soft gelatin capsule, ampul, or liquid suspension. Each of these formulations can be prepared in dosage unit form, such that one or more units contain a quantity of peptide suitable for carrying out the pancreatic insufficiency test. The size of the unit dose will, of course, vary with the size of the animal to be treated. Coated or uncoated tablets and capsules are the perferable dosage unit forms.

All of the pharmaceutical preparations of the invention can be made following the conventional techniques of the pharmaceutical chemist, such as mixing, granulating, and compressing, or variously mixing and dissolving the ingredients as appropriate to form the desired end product.

The following examples will further illustrate this invention but are not intended to limit it in any way. Unless otherwise stated, all parts are parts by weight and all temperatures are in degrees centigrade.

EXAMPLE 1

Preparation of ethyl N-benzoyl-L-phenylalanyl-p-aminobenzoate

To 13.45 g. of benzoyl-L-phenylalanine prepared by the method of R. Steiger, J. Org. Chem., 9, 396 (1944), dissolved in 300 ml. of dry tetrahydrofuran (THF), at —15° C., was added 5.5 ml. of N-methylmorpholine and 5 ml. of ethyl chloroformate. After 3 minutes, a solution of 8.25 g. of ethyl p-aminobenzoate in 50 ml. of THF was added, followed by a solution of 0.95 g. of p-toluenesulfonic acid in 35 ml. of THF. The reaction mixture was held at 5° C., and followed by thin layer chromatography on silica gel, using benzene (70 parts): ethyl acetate (30 parts): acetic acid (1 part) as developing solvent, visualizing with 50% sulfuric acid and heat. After 1 hour, the mixed anhydride had disappeared. After 2 hours, the mixture was poured into 1.5 kg. of ice and 1 liter of water, stirred for one-half hour, filtered and washed with water, 0.1 N HCl, 5% NaHCO₃, water, and dried to yield 19.6 g. of crude product. Recrystallization from benzene gave 18.6 g. of ethyl N-benzoyl-L-phenylalanyl-p-aminobenzoate, M.P. 171–174° C., $[\alpha]_D^{25}$ +81.3° (1% in dimethylformamide). Anal.: percent C found 71.9, theory 72.1; percent H found 5.7, theory 5.8; percent N found 6.5, theory 6.7.

In a similar manner, the corresponding DL-form was prepared from benzoyl-DL-phenylalanine, to give a colorless solid, M.P. 203–204° C.

EXAMPLE 2

Preparation of methyl N-benzoyl-L-phenylalanyl-p-aminohippurate

The mixed anhydride was prepared from benzoyl-L-phenylalanine, (0.81 g.), ethyl chloroformate (0.3 ml.) and methyl morpholine (3 ml. of 1 M solution in THF) in 35 ml. THF, at −15° C. After 3 minutes, 0.624 g. of methyl p-amino-hippurate dissolved in 25 ml. of THF was added, and the mixture was stirred for 5 hours at room temperature. Morpholine hydrochloride was removed by filtration, and 150 ml. of 0.1 N HCl was added. The mixture was cooled at 0° C. to complete precipitation, and filtered. The dry product, methyl N-benzoyl-L-phenylalanyl-p-aminohippurate, was recrystallized from methanol to give a colorless solid, M.P. 215–233° C., $[\alpha]_D^{23}$ +111.3° (1% in DMF). Anal.: percent C found 67.6, theory 68.0; percent H found 5.6, theory 5.5; percent N found 9.0, theory 9.2.

In similar manner, the corresponding DL-form was obtained from benzoyl-DL-phenylalanine as a crystalline solid, M.P. 204° C.

EXAMPLE 3

Preparation of N-benzoyl-L-phenylalanyl-p-aminobenzoic acid and its sodium salt

A solution was made of 13.6 g. potassium t-butoxide in 100 ml. of dimethyl sulfoxide (DMSO). To this was added a solution of 10 g. of ethyl benzoyl-L-phenylalanyl-p-aminobenzoate in 50 ml. of DMSO, at room temperature. After 5 hours, thin-layer chromatography showed no more of the ester, and the reaction mixture was then poured into a mixture of 140 ml. of 1 N HCl, one liter of water and 1.5 kg. of ice. After one-half hour, the product was filtered off, washed with water and dried. Recrystallization from ethanol and water gave 7 g. of the free acid, N - benzoyl-L-phenylalanyl-p-aminobenzoic acid, neutral equivalent 388, M.P. 245–252° C., $[\alpha]_D^{23}$ +79° (1% in DMF). Anal.: percent C found, 70.8, theory 71.1; percent H found 5.4, theory 5.15; percent N found, 7.0, theory 7.2.

The DL-isomer was prepared in a similar way from ethyl benzoyl-DL-phenylalanyl-p-aminobenzoate to give a crystalline solid, M.P. 248–252° C. The sodium salt of benzoyl-L-phenylalanyl-p-aminobenzoic acid was made by exactly neutralizing the free acid and recovering by lyophilization.

EXAMPLE 4

Preparation of N-benzoyl-L-phenylalanyl-p-aminohippuric acid and sodium salt

Following the procedure of Example 3, benzoyl-L-phenylalanyl-p-aminohippuric acid was prepared by hydrolyzing methyl benzoyl-L-phenylalanyl-p-aminohippurate.

The reaction was very much more rapid with the hippuric esters, so it was terminated after 35 minutes at room temperature. The product melted at 205–208° C., $[\alpha]_D^{24}$ +70.5° (1% in DMF), neutral equivalent 460. The DL-form was obtained as a colorless solid, M.P. 200–202° C., with the correct analysis. Reaction again was complete in 35 minutes.

The sodium salts of the L- and DL-acids were made by exactly neutralizing the free acids, and recovering by lyophilization.

EXAMPLE 5

Preparation of methyl N-benzoyl-L-phenylalanylglycylglycyl-p-aminohippurate

To a solution of 24.2 g. of benzoyl-L-phenylalanine in 200 ml. of dry THF at −10° C. was added, first 9.1 g. of N-methylmorpholine, and then over a two-minute period, 9.7 g. of ethyl chloroformate, dropwise. After 10 minutes at −10°, a slurry of 30.3 g. of the p-toluenesulfonic acid salt of benzyl glycinate and 9.1 g. of methylmorpholine in 275 ml. of THF was added, and the mixture was allowed to come to room temperature. After stirring overnight, the liquid volume was reduced to 300 ml., and the mixture was poured onto 1300 g. of ice water. After one hour, the solids were recovered by filtration. The intermediate benzyl ester, 33.7 g. melted at 149° C.

The benzyl ester, dissolved in 700 ml. of THF, was stirred with 3 g. of 5% palladium on charcoal at room temperature, while hydrogen was bubbled through, overnight. Thin layer chromatography showed no remaining ester. The catalyst was filtered off and the solution stripped. The solid residue was recrystallized to give the desired acid, with neutral equivalent of 323 (theory 326).

A solution was made of 15.8 g. of t-butoxycarbonylglycine, 18.7 g. of methyl p-aminohippurate and 18.6 g. of dicyclohexylcarbodiimide in 1300 ml. of methylene chloride. After stirring overnight, the mixture was evaporated to about 500 ml., and filtered. The solids were extracted several times with 500–700 ml. of tetrahydrofuran, filtered, and the solution evaporated to yield 29.7 g. of the THF-soluble solid. This was added to 100 ml. of trifluoroacetic acid (TFAA). After the exotherm, another 50 ml. of TFAA was added. After one hour, the TFAA was stripped off. The residue was dissolved in 120 ml. of methanol, and 300 ml. of ether was added at rom temperature. The product slowly crystallized, and was filtered to give 25.9 g. of the desired salt. Anal.: percent C found 44.0, theory 44.3; percent H found 4.26, theory 4.22; percent N found 11.04, theory 11.08.

To a solution of 16.3 g. of benzoylphenylalanylglycine in 300 ml. of dry THF was added 5.1 g. of N-methylmorpholine at −10° C. After 5 minutes, 5.4 g. of ethyl chloroformate was added over 2–3 minutes, and the mixture was stirred for 10 minutes at −10° C. A solution was meanwhile made of 19 g. of methyl N-glycyl-p-aminohippurate, TFAA salt and 5.1 g. of N-methylmorpholine in 65 ml. of dimethylformamide. This was then added to the reaction mixture, which was allowed to come to room temperature.

After 4 hours, the mixture was poured on 800 g. of ice and one liter of water, stirred for one-half hour, filtered and dried. The solid product, methyl N-benzoyl-L-phenylalanylglycylglycyl-p-aminohippurate, 25.5 g., melted at 245–252° C., $[\alpha]_D^{23}$ −38.5 (1% in DMF). Anal.: percent C found 62.7, theory 62.8; percent H found 5.6, theory 5.4; percent N found 12.1, theory 12.2.

EXAMPLE 6

Preparation of ammonium N-benzoyl-L-phenylalanylglycylglycyl-p-aminohippurate

To a solution of 0.573 g. of the methyl benzyl-L-phenylalanylglycylglycyl-p-aminohippurate, prepared as in Example 5, in 5 ml. of dimethyl sulfoxide, was added 5 ml. of 1 N potassium t-butoxide in dimethyl sulfoxide. After 15 minutes at room temperature, no remaining methyl ester was visible by thin-layer chromatography. After 35 minutes, the reaction mixture was poured into 200 ml. of cold water, containing 10 ml. of 0.5 N HCl. After standing 30 minutes, the free acid was recovered by filtration, to yield, after drying, 0.55 g. of colorless solid, ammonium N-benzoyl-L-phenylalanylglycylglycyl-p-aminohippurate, $[\alpha]_D^{24}$ −34.9 (1% in DMF). Anal.: percent C found 62.2, theory 62.3; percent H found 5.25, theory 5.19; percent N found 12.2, theory 12.5.

A later sample (9.5 g.) was dissolved in 20 ml. of 1 M NH₄OH and 200 ml. of water. About half of the water was removed in vacuo, keeping the mixture cold to prevent foaming. About 600 ml. of acetone was added, and the flask shaken to dissolve the thick residue, and then 400 ml. more was added. After standing overnight in the refrigerator, the mixture was filtered and dried to yield 8.5 g. of the ammonium salt, $[\alpha]_D^{24}$ −41 (1% in DMF).

EXAMPLE 7

Preparation of ethyl N-benzoyl-L-phenylalanyl-glycyl-p-aminobenzoate

To a solution of 10.5 g. of carbobenzoxyglycine in 100 ml. of THF at −10° C. was added 5.0 g. of triethylamine followed by 5.4 g. of ethyl chloroformate. After several minutes, a solution of 8.25 g. of ethyl p-aminobenzoate in 25 ml. of THF was added dropwise. The reaction mixture stood overnight at room temperature. It was then poured on ice and water, dried, and recrystallized from benzene to give 6.5 g. ethyl carbobenzoxyglycyl-p-aminobenzoate, M.P. 150–152° C. Anal.: percent C found, 64.0, theory 64.0; percent H found 5.8, theory 5.6; percent N found 7.9, theory 7.9.

Hydrogen gas was bubbled into a suspension of 2 g. 10% Pd on charcoal in a solution of 17.8 g. of the ethyl carbobenzoxyglycyl-p-aminobenzoate in 1600 ml. of ethanol, over a 36-hr. period. The catalyst was filtered off, and the ethanol evaporated. Recrystallized from cyclohexane, the ethyl glycyl-p-aminobenzoate melted at 88–93° C., neutral equivalent 236 (theory 222).

To the mixed anhydride from 10.8 g. of benzoyl-L-phenylalanine and ethyl chloroformate in dry THF was added 8.8 g. of the above aminoester, at −10° C. After 1.5 hours at room temperature, the mixture was poured on ice and worked up as before. The product was recrystallized from methanol to give 10 g. white solid, ethyl N - benzoyl-L-phenylalanylglycyl-p-aminobenzoate, M.P. 223–224° C., $[\alpha]_D^{24}$ −34.4° (1% in DMF).

EXAMPLE 8

Preparation of sodium and ammonium N-adipoyl-bis(L-phenylalanyl-p-aminobenzoate)

To a solution of 18.2 g. of L-phenylalanine in 110 ml. of 1 N NaOH was added simultaneously 9.15 g. of adipoyl chloride and 100 ml. of 1 N NaOH over a 2-hr. period at 5° C. so as to hold the pH at 11.5–11.8. The solution was acidified with 30 ml. of 6 N HCl and filtered. The dry solid was dissolved n 75 ml. of hot methanol, filtered, and 130 ml. of water was added to precipitate the purified adipoyl-bis (phenylalanine), M.P. 90° C. $[\alpha]_D^{24}$ −6.9 (1% in DMF), neutral equivalent 224 (theory, 220).

A solution was made of 8.8 g. of this acid in 150 ml. of dry THF. To it was added, at −15° C., 4.9 ml. of N-methylmorpholine and 200 ml. of THF. There was then added 4.4 ml. of ethyl chloroformate. After 15 minutes at −15° C. 7.26 g. of ethyl p-aminobenzoate in 20 ml. of THF and 0.76 g. of p-toluenesulfonic acid in 10 ml. of THF were added. The reaction mixture was kept at 5° C. overnight and then poured into 160 ml. of 1 N HCl+one kg. of ice+400 ml. water. After 30 minutes, it was filtered and washed. The solids were dried and recrystallized from methanol to give 10.8 g., of diethyl N - adipoyl-bis(L-phenylalanyl-p-aminobenzoate), M.P. 236–238° C. Anal.: percent C found 69.1, theory 68.7; percent H found 6.45, theory 6.3; percent N found 7.44, theory 7.63.

The ester (36 g.) was dissolved in 450 ml. of DMSO, and to the solution was added a solution of 28 g. of potassium t-butoxide in 250 ml. of DMSO. After standing 16 hours at room temperature the reaction mixture was poured into 3500 ml. of ice water containing 30 ml. conc. HCl. The precipitate was filtered and dried. It was then treated with 700 ml. of water containing 10 ml. of ammonia, and filtered through Celite. The clear filtrate was acidified, and the free acid recovered by filtration. Recrystallization from methanol and water gave the solid dibasic acid, N - adipoyl-bis(L - phenylalanyl-p-aminobenzoic acid), M.P. 273–275° C., neutral equivalent 316. Anal.: percent C found 67.3 theory 67.3; percent H found 5.5, theory 5.6; percent N found 8.1, theory 8.3.

The sodium and ammonium salts were prepared by exactly neutralizing and lyophilizing.

EXAMPLE 9

Preparation of N-benzoyl-L-tyrosyl-p-aminobenzoic acid

A mixture was made of L-tyrosine (18.1 g., 0.1 mole) benzoyl chloride (7.0 g., 0.05 mole) and 200 ml. anhydrous THF. After stirring at reflux for 2 hours, the mixture was cooled to room temperature, and the precipitate of tyrosine hydrochloride filtered off (11 g., 46 meq. Cl⁻). The THF was evaporated and the residue extracted with CCl₄ (3× 100 ml. at reflux, discarded) and then dissolved in ethyl acetate (200 ml.) filtering off insolubles. The ethyl acetate solution was evaporated to yield 13.2 g. solid product, M.P. 159–162° C. (93%). The tyrosine was recovered (8 g.) by neutralization with aqueous alkali, from the hydrochloride. A sample prepared in a similar way had $[\alpha]_{24}^D$ −76° (1% in DMF). Anal.: percent C found 67.1, calc'd 67.4; percent H found 5.2, calc'd 5.3; percent N found 4.8, calc'd 4.9.

A solution was made of N-benzyl-L-tyrosine (5.7 g., 20 mmoles) and N-methylmorpholine (2.04 g., 20 mmoles) in 60 ml. of THF, at −15° C., and to it was added ethyl chloroformate (2.08 g., 20 mmoles). After 12 minutes, p-aminobenzoic acid (2.74 g., 20 mmoles) dissolved in 25 ml. of THF and 0.38 g. of p-toluenesulfonic acid (2 mmoles) were added, and the temperature allowed to rise to 5° C. After 2 hours and forty minutes, the mixture was poured into 1 liter of 0.1 N cold HCl, stirred one-half hour, filtered and dried, to give 8.7 g., M.P. 192–223° C. The product was recrystallized from 90 ml. methanol and 40 ml. water, to give 6 g. (74%) of product, N-benzoyl-L-tyrosyl-p-aminobenzoic acid, M.P. 240–242° C., $[\alpha]_{25}^D$ +72.3° (1% in DMF). Anal.: percent C found 68.1, calc'd 68.3; H found 5.1, calc'd 5.0; percent N found 6.7, calc'd 6.9, NE 413 (theory 404).

EXAMPLE 10

Preparation of methyl N-acetyl-L-phenylalanyl-p-aminohippurate

Methyl p-aminohippurate (4.16 g., 20 mmoles) was condensed with N-acetyl-L-phenylalanine (4.14 g., 20 mmoles) by the mixed anhydride method of Example 9. After 4.5 hours at 5° C., the mixture was poured into 1.2 liters of 0.1 N cold HCl, the precipitate was filtered and dried to give 5.0 g. of methyl N-acetyl-L-phenylalanyl-p-aminohippurate, M.P. 234–238° C., $[\alpha]_{26}^D$ +73.8 (1% in DMF). An additional gram was precipitated by stripping the filtrate of THF. Yield 75%.

EXAMPLE 11

Preparation of N-acetyl-L-phenylalanyl-p-aminohippuric acid

A mixture was made of methyl N-acetyl-L-phenylalanyl-p-aminohippurate prepared as in Example 10, (5.95 g., 15 mmoles) dissolved in 25 ml. of dimethyl sulfoxide (DMSO), and potassium t-butoxide (8.4 g., 75 mmoles) dissolved in 65 ml. of DMSO. After standing at room temperature for 45 minutes, the mixture was poured into a solution of 100 ml. of 1 N HCl and 600 ml. of water. The product was filtered, and dried, and then dissolved in 500 ml. hot methanol. After the product failed to precipitate, 200 ml. of water was added, and upon cooling to −20° C., the product precipitated, and was filtered off and dried, to give 3.3 g. of N-acetyl-L- phenylalanyl-p-aminohippuric acid, M.P. 258–260° C., $[\alpha]_{25}^D$ +74.2. One gram more was obtained on further dilution. Anal.: percent C found 62.6, calc'd 62.7; percent H found 5.5, calc'd 5.5; percent N found 10.7, calc'd 11.0; THF found 387, calc'd 383.

EXAMPLE 12

Preparation of N-benzoyl-L-phenylalanylanthranilic acid

Following the procedure of Example 9, using the mixed anhydride method, from anthranilic acid (2.74 g., 20 mmoles) and benzoyl-L-phenylalanine (5.38 g., 20 mmoles) after 3½ hours at 5° C., a crude product weighing 7.35 g. (95% of theory), M.P. 215–218° C., $[\alpha]_{25}^D$ +5.4°, was obtained. After recrystallization from methanol, the product, N-benzoyl-L-phenylalanyl-anthrailic acid, (4.65 g.) melted at 218° C., $[\alpha]_{25}^D$ +9.7, NE 392 (theory 388). Anal.: percent C found 71.0, calc'd 71.1; percent H found 5.2, calc'd 5.2; percent N found 7.2, calc'd 7.3.

EXAMPLE 13

Preparation of N-benzoyl-L-phenylalanylanthranilamide

Following the procedure of Example 12, from anthranilamide (2.72 g.) and benzoyl-L-phenylalanine (5.38 g.), there was obtained after a 4½ hour reaction period 7.37 g. of crude (96%) N-benzoyl-L-phenylalanyl-anthranilamide, M.P. 165–175° C., which after recrystallization from ethyl acetate melted at 182° C., $[\alpha]_{25}^D$ +13°. Anal.: percent C found 71.7, calc'd 71.3; percent H found 5.6, calc'd 5.4; percent N found 10.9, calc'd 10.9.

EXAMPLE 14

Preparation of N-benzoyl-L-phenylalanylsulfanilamide

Following the procedure of Example 12, from sulfanilamide (8.6 g.) and benzoyl-L-phenylalanine (13.45 g.), there was obtained after a 2½ hour reaction in the mixed anhydride procedure 20 g. (95%) of the product, N-benzoyl-L-phenylalanylsulfanilamide, in good purity without recrystallization, M.P. 233–235° C., $$[\alpha]_{24.5}^D +60.2°$$

(1% in DMF). Anal.: percent C found 62.1, calc'd 62.4; percent H found 5.1, calc'd 5.0; percent N found 9.6, calc'd 9.9; percent S found 7.5, calc'd 7.6.

EXAMPLE 15

Preparation of N-benzoyl-L-tyrosylsulfanilamide

Following the procedure of Example 12, from N-benzoyl-L-tyrosine (0.285 g.) and sulfanilamide (0.172 g.), after a 2-hour reaction in the mixed anhydride procedure, there was obtained a solid, which, after recrystallization from 10 ml. 50% methanol, melted at 188–190° C., $[\alpha]_{24}^D$ +69.3° (1% in DMF), and amounted to 0.45 g., which was the desired product, N-benzoyl-L-tyrosylsulfanilamide.

EXAMPLE 16

Preparation of adipoyl bis-L-tyrosyl-p-aminobenzoic acid

L-tyrosine (7.24 g.) and adipoyl chloride (1.83 g.) were added to 75 ml. anhydrous tetrahydrofuran (THF), and the mixture was heated and stirred at reflux for two hours. Tyrosine hydrochloride was filtered off, and rinsed in with 75 ml. of THF. To the filtrate, at −20° C., was added N-methylmorpholine (2.02 g.) and ethyl chloroformate (2.17 g.) all at once. After 12 mnutes, there was then added p-aminobenzoic acid (2.74 g.) and p-toluenesulfonic (0.38 g.). After standing 2½ hours at 5° C., the reaction mixture was poured into 600 ml. of N/10 HCl, and filtered. After recrystallization from methanol and water, 3.15 g. of white solid, adipoyl bis-(L-tyrosyl-p-aminobenzoic acid) was obtained, melting at 262° C. with decomposition, $[\alpha]_{24}^D$ +72.7° (1% in dimethylformamide). Analysis, after adjustment for water, was percent C found 64.2, theory 64.2; percent H found 5.35, theory 5.53; percent N found 7.5, theory 7.9.

EXAMPLE 17

Preparation of N-benzoyl-L-methionyl-p-aminobenzoic acid

L-methionine (8.94 g.) and benzoyl chloride (4.23 g.) were added to 75 ml. tetrahydrofuran, and the mixture refluxed for two hours. The mixture was cooled, insoluble L-methionine hydrochloride was filtered off, and washed with 75 ml. tetrahydrofuran. The solution was cooled to −15° C., and to it were rapidly added N-methylmorpholine (3.03 g.) and ethyl chloroformate (3.24 g.). After 12 minutes, p-aminobenzoic acid (4.11 g.) and p-toluenesulfonic acid (0.57 g.) dissolved in 30 ml. THF were added. After two hours at 5°, the mixture was poured into 1.5 liters of cold 0.1 N HCl, filtered and recrystallized from ethyl acetate to give 6.4 g. of white solid, N-benzoyl-L-methionyl-p-aminobenzoic acid, melting at 205° C., $[\alpha]_{24}^D$ +65.7° (1% in dimethylformamide). Analysis: percent C 61.5, theory 61.3; percent H 5.4, theory 5.4; percent N 7.3, theory 7.5; percent S 8.7, theory 8.6.

EXAMPLE 18

Preparation of N-benzoyl-L-leucyl-p-aminobenzoic acid

Following the procedure of Example 17, by substituting L-leucine for L-methionine in the same molecular proportion, there was obtained a white solid, N-benzoyl-L-leucyl-p-aminobenzoic acid, in good yield, M.P. 198–200° C., $[\alpha]_{24}^D$ +95.2, percent N found 7.5, theory 7.9.

EXAMPLE 19

Preparation of N-benzoyl-L-tryptophyl-p-aminobenzoic acid

A mixture of L-tryptophane (20.4 g.) and benzoyl chloride (7.03 g.) in 100 ml. dry tetrahydrofuran was refluxed for two hours, cooled and tryptophane hydrochloride removed by filtration. To the filtrate at −15° C. was added N-methylmorpholine (5.05 g.) and ethyl chloroformate (5.43 g.), followed in twelve minutes by p-aminobenzoic acid (6.85 g.) and p-toluenesulfonic acid monohydrate (0.95 g.). After one hour at −15° C., and two hours at 5° C., the reaction mixture was poured into 1.5 liters of cold 0.1 N HCl. The product was recovered by filtration, washed and dried. It was twice dissolved in ethyl acetate, and petroleum ether added to effect the recrystallization. Charcoaling was used to remove some color. The product, N-benzoyl-L-tryptophyl-p-aminobenzoic acid, was a light tan solid and amounted to 11.5 g., $[\alpha]_{25.5}^D$ +75.8. The neutral equivalent was 434 (theory 427), percent N found 9.5, theory 9.8.

EXAMPLE 20

Preparation of N-acetyl-L-tyrosyl-p-aminobenzoic acid

To a slurry of L-tyrosine (72.4 g.) in 500 ml. dry tetrahydrofuran was added 15.7 g. acetyl chloride. The mixture was stirred for 18 hours at room temperature, and the tyrosine hydrochloride was removed by filtration. The filtrate was cooled to −15° C., N-methylmorpholine (20.2 g.) and ethyl chloroformate (21.7 g.) were added, and 15 minutes later p-aminobenzoic acid (27.4 g.) and p-toluenesulfonic acid monohydrate (3.8 g.). After one-half hour at −15° C., the mixture was stirred at 5° C. for three hours, and then poured into 6 liters of cold 0.1 N HCl, filtered, and dried. The crude product (47 g.) was recrystallized first from ethanol, ethyl acetate and petroleum ether, and then from aqueous methanol. The final recrystallized product, N-acetyl-L-tyrosyl-p-aminobenzoic acid, 26 g., melted at 229–231° C., $[\alpha]_{25.5}^D$ +91.5° (1% in dimethylformamide), neutralization equivalent 367, theory 342, percent N found 7.7, theory 8.2.

EXAMPLE 21

Preparation of N-propionyl-L-tyrosyl-p-aminobenzoic acid

Following the procedure of Example 20, substituting for the acetyl chloride, 18.5 g. propionyl chloride, 46 g. of crude product was obtained. After two recrystallization, as in Example 20, the product, N-propionyl-L-tyrosyl-p-aminobenzoic acid, melted at 241–242° C., $[\alpha]_{25.5}^D$ +89.6 (1% in DMF), neutral equivalent 372, theory 256; percent C found 63.7 (theory 64.1); percent H found 5.9, theory 5.6; percent N found 7.6, theory 7.9.

EXAMPLE 22

Preparation of N-butyryl-L-tyrosyl-p-aminobenzoic acid

Following the procedure of Example 20, substituting 20.6 ml. butyryl chloride for the acetyl chloride, there was obtained 49.1 g. of crude product which was recrystallized twice in the manner previously described. The product, N-butyryl-L-tyrosyl-p-aminobenzoic acid, melted at 223–26° C.; had $[\alpha]_{26}^D$ +78.4 (1% in DMF); neutral equivalent 383, theory, 370; percent C —64.5, theory 64.9; percent H 6.2, theory 6.0; percent N —7.4, theory 7.6.

EXAMPLE 23

Preparation of N-ethoxycarbonyl-L-tyrosyl-p-aminobenzoic acid

A mixture of L-tyrosine (36.2 g.) and ethyl chloroformate (10.9 g.) in 200 ml. tetrahydrofuran was refluxed for 24 hours. After the tyrosine hydrochloride was removed by filtration, the solution was cooled to —15° C., and to it were added N-methylmorpholine (10.1 g.) and ethyl chloroformate (10.9 g.) and 15 minutes later p-aminobenzoic acid (13.7 g.) and p-toluene sulfonic acid monohydrate (1.9 g.). After one-half hour at —15° C., the mixture was allowed to stand for 24 hours at 5° C. It was then poured into acidic water, and the gummy precipitate was extracted into one liter of ethyl acetate. The extract was dried over anhydrous magnesium sulfate, and stripped to about 100 ml., at which point solids precipitated. The solution was warmed to dissolve the solids, and then chilled to —20° C. to precipitate 20 g. of crude product. This was recrystallized again from 100 ml. of ethyl acetate, chilling to —20° C., to yield 16 g. of purified N-ethoxycarbonyl-L-tyrosyl-p-aminobenzoic acid, which had $[\alpha]_{25.5}^D$ +84.3 (1% in DMF); neutral equivalent 379 (theory 372); percent C 61.8, theory 61.3; percent H 5.7, theory 5.4; percent N 7.3, theory 7.5.

EXAMPLE 24

Preparation of N-benzoyl -L-tyrosylanthranilic acid

A solution of benzoyl-L-tyrosine in tetrahydrofuran was made by refluxing a mixture of benzoyl chloride (26.1 g.) and L-tyrosine (72.4 g.) in 400 ml. THF for two hours, cooling, filtering, and washing the precipitated L-tyrosine hydrochloride with 150 ml. THF. The filtrate, 540 ml., was divided in half, one part being used in this example; and the other in the example which follows.

One-half the filtrate, 270 ml., was cooled to —20° C., N-methylmorpholine (10.1 g.) and ethyl chloroformate (10.9 g.) were added and the reaction was stirred at —15° C. for ten minutes. Then, anthranilic acid (13.7 g.) and p-toluenesulfonic acid (1.9 g.) were added. After one-half hour at —15° C., the reaction mixture stood at 0° C. for two hours, and was then poured into 4 liters of cold 0.1 N HCl. The crude product was recovered by filtration and dried. It was recrystallized from methanol and water to give 31.8 g. of N-benzoyl-L-tyrosylanthranilic acid, M.P. 204–208° C., $[\alpha]_{25.5}^D$ +1.5° (1% in DMF). Analysis: percent C found 68.3, theory 68.3; percent H found 5.2, theory 5.0; percent N found 6.8, theory 6.9.

EXAMPLE 25

Preparation of N-benzoyl-L-tyrosyl-m-aminobenzoic acid

Following the procedure of Example 24, substituting m-aminobenzoic acid for the anthranilic acid, there was obtained 30.9 g. of the meta-isomer, M.P. 249–253° C.; $[\alpha]_{25.5}^D$ +56.8 (1% in DMF). Analysis: percent C found 68.2, theory 68.3; percent H found 5.0, theory 5.0; percent N found 6.8, theory 6.9.

EXAMPLE 26

Preparation of N-benzoyl-L-tyrosyl-4-amino-3-iodobenzoic acid

Benzoyl-L-tyrosine (14.3 g.) was dissolved in 200 ml. tetrahydrofuran, cooled to —20° C., and converted to mixed anhydride by the simultaneous addition of N-methylmorpholine (5.05 g.) and ethyl chloroformate (5.43 g.). After ten minutes at —15° C., 4-amino-3-iodobenzoic acid (13.2 g.) and p-toluene-sulfonic acid monohydrate (0.95 g.) were added. The reaction was stirred for one-half hour at —15° C., and then stood overnight at 0–5° C. The mixture was poured into 3 liters of cold 0.1 N HCl, the water layer was decanted from a viscous oil layer, and the oil layer was dried to a sticky solid. This solid, N-benzoyl-L-tyrosyl - 4-amino-3-iodobenzoic acid, (18 g.) was recrystallized from methanol to give 4 g. of off-white solids, M.P. 228–230° C., $[\alpha]_{25.6°}$—25.6 (1% in DMF). Analysis, percent N found 5.0, theory 5.3; percent I found 23.12, theory 23.96.

EXAMPLE 27

Preparation of N-benzoyl-L-tyrosyl-4-amino-2-hydroxybenzoic acid

Benzoyl-L-tyrosine (28.5 g.), dissolved in 270 ml. tetrahydrofuran, was cooled to —20° C., and converted as above to mixed anhydride. Para-aminosalicyclic acid (19.0 g.) and p-toluenesulfonic acid monohydrate (1.9 g.) were added, the mixture was stirred for one-half hour at —15° C., and stood overnight at 0° C. It was poured into two liters of 0.1 N HCl, filtered, and the precipitate dried. After being recrystallized from methanol and water, the product, N-benzoyl - L - tyrosyl-4-amino-2-hydroxybenzoic acid, melted with decomposition at 185–195° C., had $[\alpha]_{26°}^D$+77° (1% in DMF), a neutral equivalent of 422 (theory 420) and the following analysis: percent C found 66.0, theory 65.7; percent H 4.5, theory 4.8; percent N 6.5, theory 6.7.

EXAMPLE 28

Preparation of N-benzoyl-L-tyrosyl-4-amino-3-methylbenzoic acid

Following the procedure of Example 27, the compound was prepared from mixed anhydride derived from benzoyl-L-tyrosine (8.55 g.), by reaction with 4-amino-3-methylbenzoic acid (4.53 g.) and p-toluenesulfonic acid (0.57 g.) After recrystallization from methanol and water, and drying, a white product, N-benzoyl-L-tyrosyl-4-amino-3-methylbenzoic acid, 8.7 g., melting at 242–44° C., was obtained. This material had neutral equivalent of 403 (theory 418) and the following analysis: percent C 68.8 found, theory 68.9; percent H found 5.4, theory 5.3; percent N found 6.6, theory 6.7.

EXAMPLE 29

Preparation of N-benzoyl-L-tyrosyl-4-amino-3,5-dimethylbenzoic acid

Benzoyl-L-tyrosine (4.27 g.) was dissolved in 100 ml. tetrahydrofuran and cooled to —20° C. N-methylmorpholine (1.52 g.) and ethyl chloroformate (1.65 g.) were added simultaneously and the mixture was stirred for ten minutes at —15° C. To it was added 4-amino-3,5-dimethylbenzoic acid (2.48 g.) and p-toluenesulfonic acid (0.28 g.). After 48 hours at 0° C., the reaction was poured into 1.5 liters of cold 0.1 N HCl, the solid precipitate was filtered off, and recrystallized from methanol and water, to give 4.77 g. of N-benzoyl-L-tyrosyl-4-amino-3, 5 - dimethylbenzoic acid, M.P. 244–248° C., $[\alpha]_{26}°^D$ −36.9°, neutral equivalent 426, theory 432.

In any of the above examples, a solution of hydrogen chloride can be substituted for the p-toluenesulfonic acid. For example, for a 1 mole run using 137 g. of p-aminobenzoic acid, 6 g. of a 10% solution of hydrogen chloride in tetrahydrofuran (0.0165 mole) will cause the reaction with mixed anhydride from benzoyltyrosine and ethyl chloroformate to be complete in about three hours at 0 to 5° C. Similarly small amounts of hydrogen bromide, methanesulfonic acid, and sulfuric acid will give increased rates of reaction.

EXAMPLE 30

Preparation of N-benzoyl-L-tyrosyl-p-N-methylaminobenzoic acid

A 0.36 molar solution of benzoyl-L-tyrosine in tetrahydrofuran was prepared by the reaction of benzoyl chloride with L-tyrosine, as previously described. This solution (140 ml.) was cooled to −15° C., and to it were added 5.5 ml. N-methylmorpholine and 5 ml. ethyl chloroformate. After a 12-minute reaction period, 7.55 g. N-methyl-p-aminobenzoic acid and 0.95 g. p-toluenesulfonic acid were added. After stirring for three hours at −5 to −10° C., the mixture was poured into 2 liters of cold 0.1 N hydrochloric acid solution, filtered, washed and dried, to give 19.6 g. of crude product. This was recrystallized from methanol and water to give the product, N-benzoyl-L-tyrosyl-p-N-methylaminobenzoic acid, melting at 234–236° C., $[\alpha]_{26}°^D$ +190 (1% in DMF) neutral equivalent 416. Percent N found 6.4, theory 6.7.

EXAMPLE 31

In vitro enzyme assay

The compound to be tested is dissolved in Tris buffer, pH 7.8, about 0.08 M in Tris (trihydroxymethylaminomethane), to make about $5 \times 10^{-4}$ molar solution. If it is not soluble, it is dissolved in methyl Cellosolve and mixed with buffer to give up to 30% methyl Cellosolve in buffer, if necessary. The aqueous solution is mixed with stock enzyme solution (one milligram per ml. in 0.001 N HCl) in such proportions as to give a substrate to enzyme mole ratio of approximately 700:1, or if methyl Cellosolve is used, a ratio of about 30:1. After twenty-four hours, a suitable aliquot is removed, and analyzed by the Bratton-Marshall procedure, or other appropriate techniques, for the product of hydrolysis. Substantial hydrolysis will have occurred in this time with active materials.

In vitro studies of the compounds of Examples 1 to 30 show them to be suitable for use in the pancreatic insufficiency test of the invention.

EXAMPLE 32

Assessment of the pancreatic insufficiency test in vivo

Exocrine pancreatic insufficiency in animals can be produced by removing the pancreas surgically, damaging the pancreas chemically or by ligating and sectioning the pancreatic ducts and preventing the entrance of the exocrine secretion into the duodenum. The later procedure was chosen because it is reproducible and is less traumatic to the animal than the other methods. The demonstration of marked steatorrhea and azotorrhea in these animals following surgery confirmed that exocrine pancreatic insufficiency was indeed achieved. The rat, dog and Miniature African Guinea swine were found to be suitable animals for the testing. The swine and the dog have bile ducts entering the duodenum independent of the pancreatic ducts and the pancreatic duct ligation in these animals does not affect bile flow. The swine and dog which have pancreatic duct ligation and sectioning are referred to as PDLS animals. In the rat, the bile duct becomes the pancreatic duct as it traverses the pancreas. Ligation and sectioning of the pancreatic duct, therefore, also prevents bile entry into the gut. These rats are referred to as B-PDLS rats. Another rat model, BDLS, is one in which the bile duct is ligated and sectioned at a point above the pancreas and is, therefore, bile deficient but not pancreatic deficient.

Initial studies were designed to establish a dose of the peptide which would result in measureable levels of analyzable material in the urine. A dose of 10 mg. p-aminobenzoic acid (PABA) in 4 ml. H₂O/kg. body weight was found to raise urinary aromatic amine levels in rats significantly above background. Consequently, a dose of peptide providing the equivalent of 10 mg. PABA/kg. was used for rats throughout the screening studies. For swine and dogs, a dose of 5 mg. PABA equivalents was found to be sufficient. A 6-hour urine collection period was established.

The following test procedure was employed:

The animals were fasted overnight but were allowed water ad libitum until the start of the test. To perform the test, the fasted animals were placed in individual cages equipped with devices for collecting urine. The peptide of the invention was either suspended or dissolved in 4 ml. water (for rats) or 50 ml. water (for dogs and swine). The test material was placed in a syringe fitted with a dosing tube (stainless steel for rats, rubber for dogs and swine). The dosing tube was passed orally to the stomach while the animal was restrained and the contents of the syringe (test material) expressed into the stomach. The syringe was then filled with 1 ml. of air (for rats) or 10 ml. of air (for dogs and swine) and the air was forced through the dosing tube to clear the tube of any residual drug. The animal was then returned to the cage without access to water. Urine was collected for the next six hours and stored frozen after recording the total volume. The urine was later thawed at room temperature for suitable dilution and analysis.

Tables 1 to 4 summarize the results of in vivo tests of the peptides of the invention. In Table 2, the peptide was administered along with sodium bicarbonate in order to determine any possible interfering effect of gastric juices on the peptide prior to its interaction with the pancreatic enzymes.

The peptides of Tables 1 to 4 are represented as follows:

(A) ethyl N-benzoyl-DL-phenylalanyl-p-aminobenzoate
(B) ethyl N-benzoyl-L-phenylalanylglycyl-p-aminobenzoate
(C) methyl N-benzoyl-L-phenylalanyl-p-aminohippurate
(D) methyl N-benzoyl-DL-phenylalanyl-p-aminohippurate
(E) methyl N-benzoyl-L-phenylalanylglycylglycyl-p-aminohippurate
(F) ethyl N-benzoyl-L-phenylalanyl-p-aminobenzoate
(G) ammonium N-benzoyl-L-phenylalanylglycylglycyl-p-aminohippurate
(H) N-benzoyl-DL-phenylalanyl-p-aminobenzoic acid
(I) N-benzoyl-L-phenylalanyl-p-aminobenzoic acid
(J) N-benzoyl-DL-phenylalanyl-p-aminohippuric acid
(K) N-benzoyl-L-phenylalanyl-p-aminohippuric acid
(L) diammonium adipoyl-bis(L-phenylalanyl-p-aminobenzoate)
(M) sodium N-benzoyl-L-phenylalanyl-p-aminobenzoate
(N) sodium N-benzoyl-L-phenylalanyl-p-aminohippurate
(O) disodium adipoyl-bis(L-phenylalanyl-p-aminobenzoate)
(P) sodium N-acetyl-L-phenylalanyl-p-aminohippurate
(Q) N-benzoyl-L-phenylalanyl-p-aminobenzenesulfonamide
(R) sodium N-benzoyl-L-tyrosyl-p-aminobenzoate (S) disodium adipoyl-bis(L-tyrosyl-p-aminobenzoate)
(T) sodium N-acetyl-L-tyrosyl-p-aminobenzoate
(U) sodium N-propionyl-L-tyrosyl-p-aminobenzoate
(V) sodium N-butyryl-L-tyrosyl-p-aminobenzoate
(W) sodium N-benzoyl-L-tryptophyl-p-aminobenzoate
(X) sodium N-ethoxycarbonyl-L-tyrosyl-p-aminobenzoate
(Y) sodium N-benzoyl-L-tyrosyl-o-aminobenzoate
(Z) sodium N-benzoyl-L-tyrosyl-m-aminobenzoate
(AA) sodium N-benzoyl-L-tyrosyl-4-amino-3-methylbenzoate
(BB) sodium N-benzoyl-L-leucyl-p-aminobenzoate
(CC) sodium N-benzoyl-L-methionyl-p-aminobenzoate

TABLE 1

Evaluation of PABA-containing peptides for use in assessing exocrine pancreatic function in rats

| Peptide[1] | P-BDLS[3] | | Normal | |
|---|---|---|---|---|
| Sodium p-aminobenzoate (control) | 69.8 | (39.8–85.9) | 66.8 | (56.4–72.6) |
| A | 0.4 | | 2.8 | |
| B | 0.8 | | 6.8 | |
| C | 0.5 | | 5.2 | |
| D | 0.5 | | 1.1 | |
| E | 0.2 | | 0.9 | |
| F | 6.7 | (4.9–7.3) | 20.6 | (19.0–22.3) |
| G | 1.6 | (1.4–1.9) | 3.1 | (3.0–3.2) |
| H | 3.3 | (2.0–4.4) | 10.3 | (6.7–14.6) |
| I | 20.0 | (14.8–23.1) | 56.6 | (53.0–63.0) |
| J | 2.1 | (1.4–3.0) | 3.6 | (3.1–4.6) |
| K | 4.4 | (2.4–6.7) | 7.3 | (7.0–7.8) |
| R | 1.1 | (0–4.7) | 26.3 | (25.3–27.4) |
| BB | 7.8 | (3.5–15.4) | 16.4 | (9.6–26.2) |
| CC | 8.5 | (3.6–13.3) | 22.4 | (12.0–37.4) |

[1] Refer to the list of compounds tested for formula. Dose of 10 mg. PABA eq./kg. in 4 ml. $H_2O$.
[2] Means with range in parentheses. Where no ranges are given the data was obtained on pooled urine.
[3] Pancreatic-bile duct ligated and sectioned.

TABLE 2

Effects of $NaHCO_3$ in the evaluation of PABA-containing peptides for use in assessing exocrine pancreatic function in rats

| Peptide:[1] | P-BDLS[3] | | Normal | |
|---|---|---|---|---|
| M | 27.1 | (23.4–31.7) | 74.7 | (66.2–80.6) |
| R | 11.9 | (9.8–15.8) | 55.2 | (44.2–66.2) |
| T | 23.4 | (19.9–25.3) | 77.9 | (73.6–81.1) |
| U | 29.5 | (18.9–36.8) | 68.8 | (65.5–72.1) |
| V | 11.0 | (9.6–12.3) | 67.3 | (59.9–72.1) |
| W | 12.7 | (7.1–18.1) | 33.0 | (24.1–34.7) |
| X | 6.9 | (5.7–9.1) | 64.9 | (49.3–67.2) |
| Y | 2.4 | (1.9–2.9) | 7.4 | (3.7–9.8) |
| Z | 1.6 | (0.7–2.6) | 43.0 | (33.4–50.7) |
| AA | 1.3 | (1.0–1.8) | 18.2 | (12.8–20.3) |

[1] Refer to the list of compounds tested for formula. Dose of 10 mg. PABA equivalents/kg. with 4 ml. 0.5% $NaHCO_3$.
[2] Mean with range in parenthesis.
[3] Pancreatic bile duct ligated and sectioned.

TABLE 3

Evaluation of PABA-containing peptides for use in assessing exocrine pancreatic function in miniature African Guinea Swine

| Peptide[1] | PDLS[3] | | Normal | |
|---|---|---|---|---|
| Sodium p-aminobenzoate (Control) | 48.5 | (39.4–62.4) | 64.0 | (44.5–81.2) |
| G | 2.6 | | 6.8 | |
| H | 1.8 | (0.8–2.7) | 4.8 | (0.3–9.9) |
| I | 0.9 | (0–2.3) | 9.2 | (7.2–10.8) |
| J | 0.5 | | 3.0 | (1.7–4.3) |
| K | 0.3 | (0.2–0.7) | 3.8 | (0.8–7.4) |
| L | 1.3 | | 5.3 | |
| M | 3.4 | (3.0–4.0) | 20.5 | (10.7–34.7) |
| N | 1.1 | (0.2–2.0) | 3.8 | (2.4–6.6) |
| O | 3.6 | (0.5–10.0) | 29.9 | (0.5–66.9) |
| P | 2.2 | (0.6–3.5) | 4.9 | (3.6–9.4) |
| Q | 0.7 | (0–2.6) | 4.0 | (0.8–9.8) |
| R | 0.8 | (0–4.3) | 20.7 | (4.0–41.0) |
| S | 11.7 | (3.4–23.6) | 18.5 | (7.0–25.5) |
| T | 4.1 | (2.8–3.5) | 44.4 | (20.3–58.0) |
| U | 2.4 | (1.2–3.3) | 46.3 | (36.8–57.6) |
| V | 2.9 | (1.7–5.0) | 47.1 | (41.6–57.2) |
| W | 3.0 | (1.7–4.0) | 23.1 | (16.9–28.2) |
| X | 2.2 | (1.3–2.9) | 39.1 | (36.9–41.3) |

[1] Refer to the list of compounds tested for formula. Dose of 5 mg. PABA eq./kg. in 50 ml. $H_2O$.
[2] Means with range in parentheses. When no range is given only one animal was used.
[3] Pancreatic duct ligated and sectioned.

TABLE 4

Evaluation of PABA-containing peptides for use in assessing exocrine pancreatic function in dogs

| Peptide[1] | PDLS[3] | | Normal | |
|---|---|---|---|---|
| M | | | 54.8 | (49.6–80.0) |
| R | 3.9 | (1.6–5.8) | 65.8 | (16.2–66.0) |
| T | | | 66.2 | (61.4–72.6) |
| U | | | 64.6 | (61.4–66.8) |
| V | | | 66.9 | (52.2–75.1) |
| W | | | 52.3 | (29.8–68.0) |
| X | | | 66.0 | (62.6–69.5) |

[1] Refer to the list of compounds tested for formula. Dose of 5 mg. PABA eq./kg. in 50 ml. $H_2O$.
[2] Mean with range in parentheses.
[3] Pancreatic duct ligated and sectioned.

The data in Tables 1 to 4 show the usefulness of the peptides of the invention in determining pancreatic enzyme insufficiency in animals.

EXAMPLE 33

Pharmaceutical formulations

Illustrative pharmaceutical composition formulations comprising a peptide of the invention are set forth below. In each formulation, the designated materials are given in proportions by weight.

TABLETS

| Ingredients: | Parts by weight |
|---|---|
| Sodium N-benzoyl-L-phenylalanyl-p-aminobenzoate | 500 |
| Corn starch | 100 |
| Ethylcellulose | 20 |
| Calcium stearate | 30 |

After thoroughly blending the above ingredients, tablets are formed by standard means so as to contain 500 mg. of peptide per tablet.

CAPSULES

| Ingredients: | Parts by weight |
|---|---|
| Sodium N-benzoyl-L-tyrosyl-p-aminobenzoate | 500 |
| Corn starch | 50 |
| Talc | 50 |

The above ingredients are agitated sufficiently to obtain a uniformly powdered product which is then utilized for the filling of gelatin capsules, both the hard-shelled and soft elastic types. Capsules should be chosen which are of such a size as to be capable of accommodating a sufficient quantity of material to provide 500 mg. of peptide per unit. Of course, larger or smaller capsules for different concentrations of active agent may be readily employed where desired or necessitated.

EXAMPLE 34

Preparation of α-benzoyl-L-ylsyl-p-aminobenzoic acid 14.0 g. of ε-carbobenzoxy-L-lysine was dissolved in 24.5 ml. of 2.05 N NaOH and 70 ml. of water at 0°. Benzoyl chloride, 7 g., was added dropwise to the stirred solution simultaneously with an additional 24.5 ml. of base over a 30-min. period. After 20 minutes, the solution was acidified to pH 3 with 6 N hydrochloric acid. The precipitate was filtered and dried. The solid, α-benzoyl-ε-carbobenzoxy-L-lysine, which melted at 105–112°, and had neutral equivalent 397, amounted to 15.4 g. It was dissolved in 200 ml. of tetrahydrofuran and the solution cooled to −15° C. N-methylmorpholine (4.4 ml.) and ethyl chloroformate (4 ml.) were added, and after ten minutes at −15° C., 5.5 g. of p-aminobenzoic acid and 0.76 g. p-toluenesulfonic acid were added. After ½ hour at −10° C. and 16 hours at 0° C., the mixture was poured into 2.5 liters of cold 0.1 N hydrochloric acid and filtered. After drying, the precipitate amounted to 19.2 g., NE 495, M.P. 187–190° C., $[\alpha]_D^{25.5}$ +44.8 (1% in DMF). Two grams of this solid, α-benzoyl-ε-carbobenzoxy-L-lysyl-p-aminobenzoic acid, was dissolved in 200 ml. methanol and reduced with hydrogen in the presence of one gram of 5% palladium on charcoal for a 70-hour period at atmospheric pressure and room temperature. The catalyst was filtered off and the solvent was removed in vacuo. The residue was washed with a little tetrahydrofuran and dried in vacuo. Titration of the ε-amino function with perchloric acid in glacial acetic acid gave a neutral equivalent of 384. (Calculated for α-benzoyl-L-lysyl-p-aminobenzoic acid, 369.)

The product was rapidly hydrolyzed in the presence of trypsin, but not in the presence of chymotrypsin.

It is to be understood that changes and variations may be made without departing from the spirit and scope of the invention as defined by the appended claims.

What is claimed is:

1. A compound of the formula $$RCO-A_n-NHR'CO-B_m-NHZ$$

wherein

R is a hydrogen atom; a phenyl group; a phenyl group substituted with one or more halogen atoms, $(C_1-C_4)$ alkyl groups, hydroxy groups, $(C_1-C_4)$alkoxy groups, $(C_1-C_4)$alkanoyloxy groups, or $(C_1-C_4)$alkoxycarbonyl groups; a $(C_1-C_{12})$alkyl group; a $(C_1-C_{12})$alkyl group substituted with one or more halogen atoms, $(C_1-C_4)$alkoxy groups, hydroxy groups, $(C_1-C_4)$alkanoyloxy groups, polyalkoxyalkyl groups, or phenyl groups; a $(C_1-C_{12})$alkoxy group; an aralkoxy group of up to 10 carbon atoms; or a divalent alkylene group having up to 6 carbon atoms;

NHR'CO is an amino acid linkage derived from L-phenylalanine, L-tyrosine, L-leucine; L-methionine, L-tryptophan, L-arginine, or L-lysine;

Z is a group of the formula

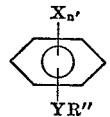

wherein

R" is a hydroxy group, a $(C_1-C_4)$alkoxy group, a $(C_1-C_4)$alkoxyalkoxy group, a $(C_1-C_8)$dialkylaminoalkoxy group, an amino group, a $(C_1-C_4)$monoalkylamino group, a $(C_1-C_4)$dialkylamino group, a group of the formula —NHCH$_2$COR", or a salt of the group in which R" is a hydroxy group;

Y is a group of the formula —CO—;

X is a hydroxy group, a $(C_1-C_4)$alkyl group, a halogen atom, or a $(C_1-C_4)$alkoxy group; and n' is 0, 1, or 2;

A and B are the residues of low molecular weight amino acids, and m and n are 0, 1, or 2.

2. A compound according to claim 1 wherein n and m are zero.

3. A compound according to claim 2 wherein R is a phenyl group.

4. A compound according to claim 2 wherein R is a $(C_1-C_4)$alkyl group.

5. A compound according to claim 2 wherein R is a $(C_1-C_4)$alkoxy group.

6. A compound according to claim 2 wherein NHR'CO is phenylalanyl, tyrosyl, or tryptophyl.

7. A compound according to claim 2 wherein Z is 4-carboxyphenyl, the sodium salt of 4-carboxyphenyl, or the ammonium salt of 4-carboxyphenyl.

8. A compound according to claim 2 wherein the compound is N-benzoyl-L-phenylalanyl-p-aminobenzoic acid, its sodium salt, or its ammonium salt.

9. A compound according to claim 2 wherein the compound is N-benzoyl-L-tyrosyl-p-aminobenzoic acid, its sodium salt, or its ammonium salt.

10. A compound according to claim 2 wherein the compound is N-acetyl-L-tyrsoyl-p-aminobenzoic acid, its sodium salt, or its ammonium salt.

11. A compound according to claim 2 wherein the compound is N-propionyl-L-tyrosyl-p-aminobenzoic acid, its sodium salt, or its ammonium salt.

12. A compound according to claim 2 wherein the compound is N-butyryl-L-tyrosyl-p-aminobenzoic acid, its sodium salt, or its ammonium salt.

References Cited

UNITED STATES PATENTS

| | | | |
|---|---|---|---|
| 2,715,119 | 8/1955 | Wieland et al. | 260—561 A |
| 3,647,775 | 3/1972 | Marquarding et al. | 260—112.5 |
| 3,330,857 | 7/1967 | Hess | 260—112.5 |
| 2,948,714 | 8/1960 | Amiard et al. | 260—112.5 |
| 3,646,137 | 2/1972 | Brown | 260—557 R |

ELBERT L. ROBERTS, Primary Examiner

R. J. SUYAT, Assistant Examiner

U.S. Cl. X.R.

260—557 R, 558 A, 561 A, 562 N, 562 A